O. MUSSINAN.
PNEUMATIC CUSHION HEEL.
APPLICATION FILED FEB. 9, 1916.

1,203,898. Patented Nov. 7, 1916.

Inventor:
Oscar Mussinan
By Leo Attorney
Edmond Cooper Brown

UNITED STATES PATENT OFFICE.

OSCAR MUSSINAN, OF NEW YORK, N. Y.

PNEUMATIC-CUSHION HEEL.

1,203,898.  Specification of Letters Patent.  Patented Nov. 7, 1916.

Application filed February 9, 1916. Serial No. 77,231.

*To all whom it may concern:*

Be it known that I, OSCAR MUSSINAN, a citizen of the United States, and a resident of the borough of Manhattan, in the city and State of New York, have invented certain new and useful Improvements in Pneumatic-Cushion Heels, of which the following is a specification.

My invention relates to rubber heels, and has for one of its principal objects to provide such a heel which shall combine with the ordinary cushion heel the additional feature of a pneumatic cushion chamber.

Other objects of the invention will be apparent from the following description.

The invention consists in the novel construction, arrangement and combination of various devices, elements and parts, as shown in the accompanying drawings and fully described in this specification.

Figure 1:
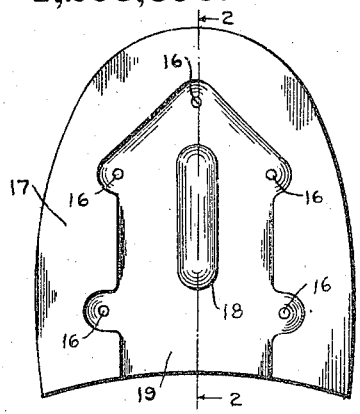
Figure 2:
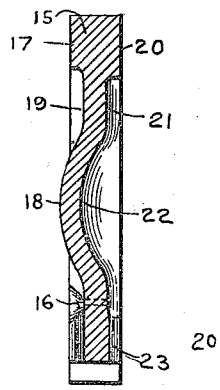
Figure 3:
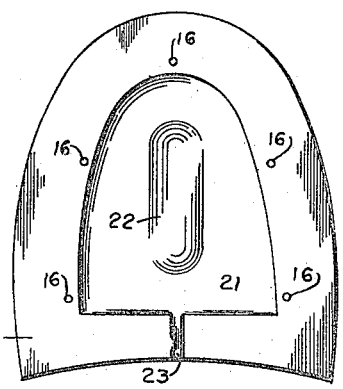
Figure 4:
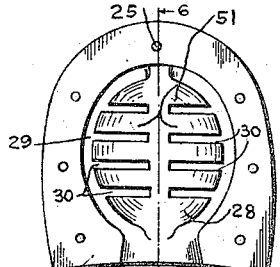
Figure 7:
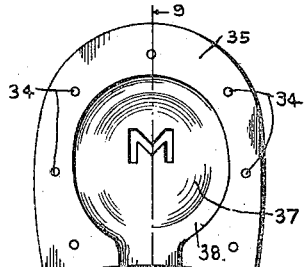
Figure 10:
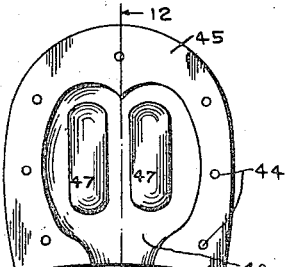
Figure 5:
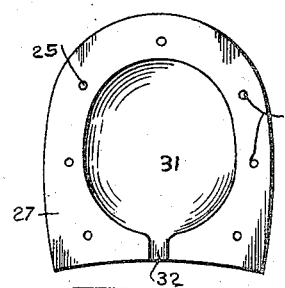
Figure 8:
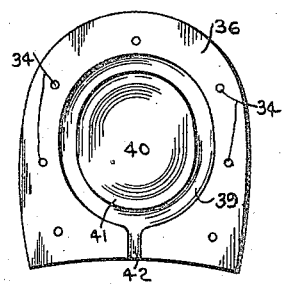
Figure 11:
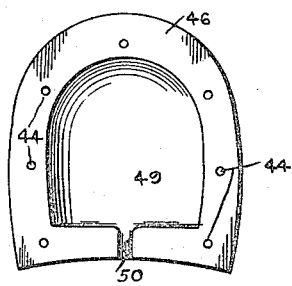
Figures 6, 9, 12:
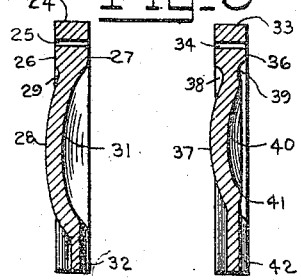

In the said drawings, Figure 1 is a bottom view of one form of my invention; Fig. 2 is a section taken on the line 2—2 of Fig. 1; Fig. 3 is a top view of the form shown in Fig. 1; Fig. 4 is a bottom view of another form of my invention; Fig. 5 is a top view of this form shown in Fig. 4; Fig. 6 is a section taken on the line 6—6 of Fig. 4; Fig. 7 is a bottom view of still another embodiment of my invention; Fig. 8 is a top view thereof; Fig. 9 is a section taken on the line 9—9 of Fig. 7; Fig. 10 is a bottom view of another embodiment; Fig. 11 is a top view of this embodiment shown in Fig. 10; and Fig. 12 is a section taken on the line 12—12 of Fig. 10.

In carrying my invention into effect in the embodiment shown in Figs. 1, 2 and 3, I provide a rubber heel 15 having suitable perforations 16, whereby it is adapted to be secured by nails or otherwise to the heel of a boot or shoe. The lower or tread side of this rubber heel, as shown in Fig. 1, is provided with a peripheral tread portion 17, a central projection 18 extending beyond the face of said tread 17, and a recess 19 intermediate said tread 17 and said projection 18. The upper side of the heel, shown in Fig. 3, is provided with a face portion 20 adapted to be tightly secured against the bottom of the heel of a boot or shoe, and a centrally located pneumatic cushion chamber 21 of semi-elliptical form. This pneumatic chamber 21 is provided with a central depression 22, which is, as shown in Fig. 2 located opposite the projection 18, the entire central portion of the heel being of approximately equal thickness. The pneumatic chamber 21 is connected with the outer air by a small vent opening 23.

In the embodiment shown in Figs. 4, 5 and 6, I provide a heel 24 having perforations 25, a tread portion 26, and a face portion 27. I provide a projection 28 analogous to the projection 18, but comparatively broad and flat. In this embodiment the intermediate recess, designated 29 is confined to a small annular portion between the tread 26 and projection 28, together with the recesses 30, which form between them ribs 51. The pneumatic chamber, here designated 31, is approximately elliptical in form and conforms to the oppositely located projection 28 without the use of any centrally located depression such as is shown in Fig. 3. The chamber 31 is provided with a vent tube 32.

In the embodiment shown in Figs. 7, 8 and 9, I provide a heel 33 having perforations 34, a tread 35, and a face portion 36. The tread side of the heel is provided with a central projection 37, of a form somewhat similar to the projection 28 of Fig. 4, except that the projection 37 is not intersected by recesses, as is the projection of Fig. 4. A narrow annular recess 38 is provided between this projection 37 and the tread 35. In this embodiment, the pneumatic chamber comprises an elliptical groove 39, and a central depression 40 conforming with the oppositely located projection 37. The portions 39 and 40 are separated from each other by an annular ridge 41, which ridge does not, however, as will be seen from Fig. 9, extend to the level of the face 36. The pneumatic chamber is provided with a vent 42.

In the embodiment shown in Figs. 10, 11 and 12, I provide a heel, 43, having perforations 44, a tread 45, and a face 46. On the tread side of the heel I provide two projections 47, analogous to the single projections 18 of Fig. 1, and a recess 48 surrounding both of said projections, and isolating them from the tread 45. I provide a pneumatic chamber 49, somewhat similar to the chamber 21 of Fig. 2, and provided with a vent 50; this chamber being shaped to conform to the oppositely located projections 47 and recess 48.

When a heel of any of the embodiments of my invention is attached to a boot or shoe, at every step the central projection on the tread side strikes the ground first, and is forced inward, compressing the air in the pneumatic chamber, which bears the heaviest part of the impact. After the projection has been forced flush with the tread, the said tread comes in contact with the ground, and the device then acts similarly to the ordinary solid cushion heel. The projection is separated from the tread by a recess, in order that it may be free to be so forced inward under pressure, and to resume its former position upon the removal of the pressure.

The vent tubes provided with the various embodiments of my invention are too small to have any appreciable detrimental action on the sudden compression of the air in the pneumatic chamber under impact, but are large enough to permit air to pass slowly from the chamber to the outer atmosphere, or vice versa. Their purpose is to obviate the possibility of the air in the pneumatic chamber being forced out when the temperature is warm, and the pressure of the atmosphere then collapsing the chamber when the temperature becomes cooler.

The advantages of my invention will be obvious from what has been above said concerning its construction and use. I do not limit myself to the exact forms described, as it is obvious that various other embodiments might be employed, without departing from the spirit and scope of my invention.

Having thus described my invention, what I claim as new and desire to secure by Letters Patent is as follows:

1. A cushion heel provided with a peripherally located tread portion, a centrally located tread portion extending outside the plane of said first named portion, a recess intermediate said tread portions, and a pneumatic chamber.

2. A cushion heel provided with a peripherally located tread portion, a centrally located tread portion, a recess intermediate said tread portions, and a pneumatic chamber provided with a depression extending within said central tread portion.

3. A cushion heel provided with a peripherally located tread portion, a centrally located tread portion provided with a plurality of projections, a recess intermediate said tread portions and a pneumatic chamber.

4. A cushion heel provided with a peripherally located tread portion, a centrally located tread portion provided with a plurality of projections extending below the plane of said first named tread portion, a recess intermediate said tread portions, and a pneumatic chamber.

5. A cushion heel provided with a peripherally located tread portion, a centrally located tread portion, a recess intermediate said tread portions, and a pneumatic chamber provided with a depression extending within said second named tread portion, said depression being surrounded by an annular ridge.

6. A cushion heel provided with a peripherally located tread portion, a centrally located tread portion extending outside the plane of said first named tread portion, a recess intermediate said tread portions, and a pneumatic chamber connected by a vent with the outer air.

7. A cushion heel provided with a peripherally located tread portion, a centrally located tread portion, a recess intermediate said tread portions, and a pneumatic chamber provided with a depression extending within said central tread portion, said chamber being connected by a vent with the outer air.

In witness whereof I have hereunto signed my name this 7th day of February 1916.

OSCAR MUSSINAN.